Aug. 28, 1962     H. PAULUS     3,050,815
METHOD OF AND APPARATUS FOR LIMITING THE
SHEARING OPERATION OF CLOTH

Filed Feb. 17, 1960     2 Sheets-Sheet 1

Aug. 28, 1962 H. PAULUS 3,050,815
METHOD OF AND APPARATUS FOR LIMITING THE
SHEARING OPERATION OF CLOTH
Filed Feb. 17, 1960 2 Sheets-Sheet 2

INVENTOR
HENRI PAULUS
BY Ernest Montague

ATTORNEY.

3,050,815
METHOD OF AND APPARATUS FOR LIMITING THE SHEARING OPERATION OF CLOTH
Henri Paulus, 59 Rue Neuve, Dison, Belgium
Filed Feb. 17, 1960, Ser. No. 9,254
Claims priority, application Belgium Feb. 19, 1959
7 Claims. (Cl. 26—15)

The present invention relates to a method of and apparatus for limiting the shearing operation of cloth.

It frequently happens, at the time of finishing or dressing textile fabrics, that a wider or narrower part of one or both of the edges of these fabrics is not to be sheared or velveted or otherwise worked.

Up to the present, in case of shearing, for example, the fabric is guided by hand or automatically, while a worker displaces the movable part of a table, which constitutes the support for the fabric and feeds it to the shearing members, in such manner that the selvedges are caused to fall outside the field of action of the shearing members.

This intervention by the worker has hitherto been indispensable, for even if one of the edges of the fabric is properly guided, in many cases the width of the fabric varies in the same piece, so that the other edge of the fabric appears differently for the shearing action.

It is one object of the present invention to provide a method and an apparatus which omits the expensive intervention, while still continuing the regular work.

It is another object of the present invention to provide an apparatus wherein, in order to obviate the control of the fabric by the operator, the shearing or working members can be displaced by any known means in transverse direction of the fabric, either perpendicularly or obliquely, in such manner that one or both of the selvedges of the fabric will be located outside the field of action of the shearing or working system.

It is a further object of the present invention to provide an apparatus for performing a perpendicular or oblique displacement of the system which feeds the fabric to the shearing or working system in such manner that one edge of the fabric, or both edges, are outside the field of action of the shearing or working members.

For putting into operation, in combination, if desired, one or the other method of procedure, the detection of the positions of the selvedges of the fabric is brought about by photo-electric means which are so arranged as to act, through the medium of any suitable means, upon the working members, upon the system feeding the fabric to the working members, in such manner as to leave wider or narrower strips of fabric outside the action of shearing of the working members.

Besides the advantage of eliminating manual labor, the present invention provides the possibility, so far as the shears of a number of shearing systems are concerned, of equipping the cylinders, without inconvenience, with helical blades, one of which has a left-hand pitch and the other has a right-hand pitch, and vice-versa.

With these and other objects in view, which will become apparent in the following detailed description, the present invention will be clearly understood in connection with the accompanying drawings, in which.

Figure 1:
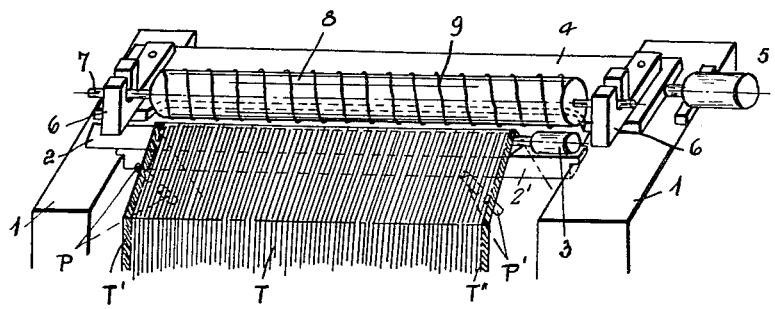
FIGURE 1 is a diagrammatic front perspective view of the shearing machine.
Figure 2:
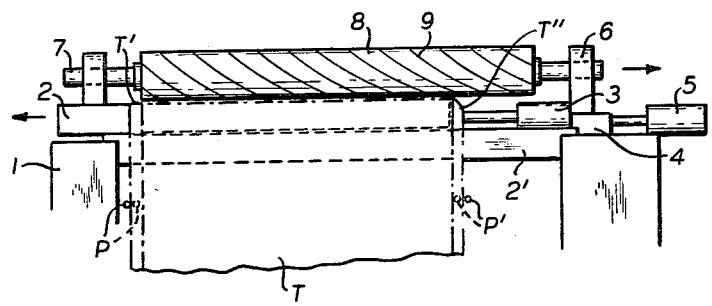
FIG. 2 is a front elevation of the shearing machine.
Figure 3:
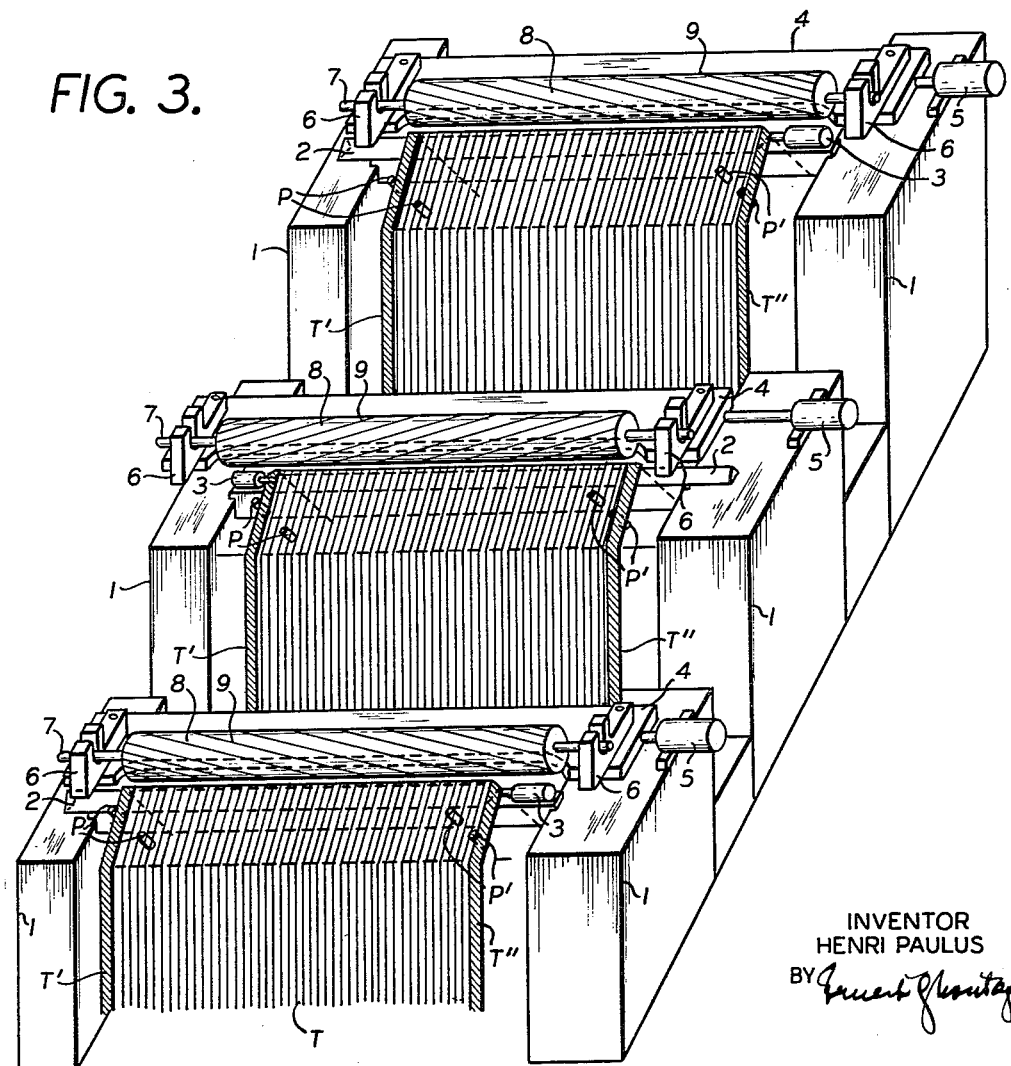
FIG. 3 is a diagrammatic front perspective view of the shearing machine having a plurality of cylinders.

Referring now to the drawings, and in particular to FIG. 1, a shearing table comprising a table part 2 is mounted upon the frames 1 of the machine, which table part 2 can be displaced transversely under the action of a piston 3 or of any other suitable actuating member, by moving on a support 2' disposed between the frames 1.

In the case of a shearing machine the table is generally called a ridge table, a prismatic table or a hollow table, according to its type.

On the frames 1 is also arranged a cross-bar 4, which can be displaced by a piston 5 or by any other suitable actuating member. The cross-bar 4 carries bearings 6, in which the shaft 7 of at least one shearing cylinder 8 is mounted, the cylinder 8 being equipped with helical blades 9. The cross-bar 4 also supports, in known manner, a flat blade-holder (not shown).

The fabric T to be sheared has two selvedges T' and T'', which are detected by photo-electric cells P and P', a pair of photo-electric cells being arranged on each side of the fabric T. The cells P and P' are adjustable in relation to their associated selvedges T' and T''.

As the fabric T advances in the machine, the left-hand photo-electric cell P determines the position of the left-hand selvedge T' in relation to the cutting system formed by the shearing cylinder 8 and the flat blade-holder (not shown), which are mounted upon the cross-bar 4. The photo-electric cell P, adjusted with this end in view, causes by suitable means the desired displacement of the cross-bar 4, by means of the piston 5 and rectifies, if necessary, the position of the cutting system in relation to the left-hand edge of the fabric T, so that a certain length of left-hand selvedge will remain outside the shearing action.

Similarly the right-hand photo-electric cell P' controls the position of the right-hand selvedge T'' of the fabric. It will act upon the piston 3, which will then cause the lateral displacement of the table 2, without lateral displacement of the fabric T, so as to remove the support by the table 2 of the right selvedge T'', namely the part of the edge of the fabric T disposed to its right, which is not to be sheared. The lateral movement of the table and of the cross-bar can be performed separately or simultaneously.

It will be readily understood that owing to the combined action of the two cells P and P', it is possible to leave both edges of the fabric outside the shearing action, over a greater or smaller breadth, determined by the adjustment of the cells P and P'.

As stated before, the shearing table comprises a table part 2 which is displaceable transversely by means of a piston 3 between the frames 1. The table 2 is mounted on a support 2', which is disposed between the frames 1, so that the table part 2 is movable on the support 2'. It has been also stated before that a cross-bar 4, which is also supported by the frames 1, is displaceable by a piston 5. The photo-electric cells control the lateral displacements of the cylinder 8 and/or of the table 2.

If one selvedge covers one of the photo-electric cells of a corresponding pair of cells, no movement of the cylinder 8 or of the table part 2, whichever is related, takes place.

If, however, the selvedge does not cover either of the photo-electric cells of the pair, the displacement of the cylinder 8 to the right, or of the table 2 towards the left, whichever is related, or the displacement of both members simultaneously, should the situation be identical at the other selvedge, is brought about. On each side there are two of such photo-electric cells, which provide in known manner the control of the laterally moving elements.

If the right margin of the cloth falls narrower, the table 2 moves towards the left to leave the selvedge at the right end of the fabric not supported by the table 2, so that no shearing operation can take place on the right selvedge of the fabric. Thus, if the right selvedge of the fabric is not free of treatment by the shearing operation, only the table 2 will be moved towards the left.

If, however, the left selvedge would not be left free from the shearing operation, only the cross-bar would be moved towards the right.

If now both selvedges are not left free from the shearing operation, both laterally movable elements are moved, the cross-bar 4 being moved towards the right and the table 2 is moved towards the left.

This arrangement brings about that both selvedges are left outside of the shearing operation, because on the one hand, the movement to the right of the cross-bar 4 and, thereby, of the shearing cylinder 8 is achieved in response to the position of the left selvedge, and, on the other hand, the movement to the left of the table 2 is achieved in response to the position of the right selvedge, by reducing the width of support of the cloth by the table 2.

In the embodiments shown in the drawings and described above, the displacement of the shearing system has thus been utilized in combination with the displacement of the movable table. It would also be quite possible to combine one of these displacements with a fabric-guiding system.

As has been stated, the application of the process according to the present invention renders it possible to provide shearing machines having tables equipped with a single ridge and having a plurality of cylinders provided alternately with a spiral of left-hand pitch and a spiral of right-hand pitch, which has hitherto not been feasible.

While I have disclosed several embodiments of the present invention, it is to be understood that these embodiments are given by example only and not in a limiting sense, the scope of the present invention being determined by the objects and the claims.

I claim:

1. A method of limiting the shearing operation of cloth fed over a laterally displaceable table towards a laterally displaceable shearing cylinder, comprising the steps of moving said cloth in longitudinal direction and laterally displacing said table and said shearing cylinder, respectively, in opposite directions relative to each other, in order to move selectively at least one of the selvedges of said cloth out of the working range of said shearing cylinder.

2. The method, as set forth in claim 1, wherein said movements of said table and of said shearing cylinder, respectively, are performed separately.

3. The method, as set forth in claim 1, wherein said movements of said table and of said shearing cylinder, respectively, are performed simultaneously.

4. The method, as set forth in claim 1, wherein said movements of said table and of said shearing cylinder, respectively, are performed in response to detecting means cooperating with the selvedges of said cloth.

5. An apparatus for limiting the shearing operation of cloth comprising a frame, a shearing table mounted on said frame for lateral movement, a piston integrally formed with said table, a cross-bar disposed on said frame for lateral movement, at least one shearing cylinder supported by said cross-bar for lateral movement therewith and a piston integrally formed with said cross-bar, said shearing table and said cross-bar being movable in opposite directions relative to each other, and sensing means disposed opposite the selvedges of said cloth and causing the lateral movement of said cross-bar and of said shearing table, respectively, in response to a decrease of the width of said cloth.

6. An apparatus for limiting the shearing operation of cloth comprising a frame, a shearing table mounted on said frame for lateral movement, a piston integrally formed with said table, a cross-bar disposed on said frame for lateral movement, at least one shearing cylinder supported by said cross-bar for lateral movement therewith and a piston integrally formed with said cross-bar, and photo-electric means detecting the selvedges of said cloth causing lateral movement of said table and of said cross-bar, respectively, in response to the movement of said selvedges of said cloth along said table, and said shearing table and said cross-bar being movable in opposite directions.

7. The apparatus, as set forth in claim 5, which includes a plurality of said shearing cylinders, each of said cylinders having helical blades, each pair of adjacent cylinders having said helical blades disposed in different directions.

References Cited in the file of this patent

UNITED STATES PATENTS

| | | |
|---|---|---|
| 203,388 | Sumner | May 7, 1878 |
| 265,882 | Smith | Oct. 10, 1882 |
| 592,744 | Brown | Oct. 26, 1897 |
| 615,190 | Fountain | Nov. 29, 1898 |